United States Patent
Huntzicker et al.

(10) Patent No.: US 9,886,801 B2
(45) Date of Patent: *Feb. 6, 2018

(54) VEHICLE SENSOR COMPENSATION

(71) Applicant: GM GLOBAL TECHNOLOGY OPERATIONS LLC, Detroit, MI (US)

(72) Inventors: Fred W. Huntzicker, Ann Arbor, MI (US); Paul R. Williams, Northville, MI (US); Xiaofeng F. Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,176

(22) Filed: Feb. 4, 2015

(65) Prior Publication Data

US 2016/0223657 A1 Aug. 4, 2016

(51) Int. Cl.
*G07C 5/08* (2006.01)
*G01S 17/93* (2006.01)
*G01S 7/497* (2006.01)
*G01S 7/40* (2006.01)
*G01S 13/93* (2006.01)
(Continued)

(52) U.S. Cl.
CPC .......... *G07C 5/0808* (2013.01); *G01S 7/4026* (2013.01); *G01S 7/4972* (2013.01); *G01S 13/931* (2013.01); *G01S 17/936* (2013.01); *G01B 21/24* (2013.01); *G01S 13/865* (2013.01); *G01S 13/867* (2013.01);
(Continued)

(58) Field of Classification Search
CPC .......................... G01S 7/4972; G01S 2007/403
See application file for complete search history.

(56) References Cited

U.S. PATENT DOCUMENTS 5,422,829 A * 6/1995 Pollock .................. G01S 13/58
342/133
5,512,904 A * 4/1996 Bennett .................. G01C 21/28
342/357.32
(Continued)

FOREIGN PATENT DOCUMENTS

CN 102778670 A 11/2012
CN 103287258 A 9/2013
(Continued)

OTHER PUBLICATIONS

Song, Xiaofeng F., U.S. Appl. No. 14/229,178 entitled "System and Method for Determining of and Compensating for Misalignment of a Sensor," filed Mar. 28, 2014.
(Continued)

*Primary Examiner* — John Olszewski
*Assistant Examiner* — Thomas E Worden
(74) *Attorney, Agent, or Firm* — Lorenz & Kopf, LLP

(57) ABSTRACT

Methods and systems for vehicle sensor compensation are provided. A sensor is configured to at least facilitating obtaining sensor data pertaining to an object in proximity to the vehicle. The sensor data includes a measured azimuth angle value for the object. A processor is coupled to the sensor. The processor is coupled to the sensor, and is configured to at least facilitate estimating a misalignment angle for the sensor using the sensor data and generating a correction factor for the measured azimuth angle value using the misalignment angle.

16 Claims, 3 Drawing Sheets

(51) Int. Cl.
*G01B 21/24* (2006.01)
*G01S 13/86* (2006.01)

(52) U.S. Cl.
CPC . *G01S 2007/403* (2013.01); *G01S 2013/9353* (2013.01); *G01S 2013/9367* (2013.01)

(56) References Cited

U.S. PATENT DOCUMENTS

| | | | | |
|---|---|---|---|---|
| 5,964,822 | A * | 10/1999 | Alland | G01S 7/4004 342/90 |
| 6,175,802 | B1 * | 1/2001 | Okude | G01C 21/32 348/118 |
| 6,202,027 | B1 * | 3/2001 | Alland | G01S 7/4004 340/435 |
| 6,356,229 | B1 | 3/2002 | Schneider | |
| 6,587,784 | B1 * | 7/2003 | Okude | G01C 21/3638 348/123 |
| 7,337,650 | B1 * | 3/2008 | Preston | B60W 40/11 73/1.38 |
| 8,930,063 | B2 | 1/2015 | Gandhi et al. | |
| 2004/0027272 | A1 * | 2/2004 | Richardson | B60K 31/0008 342/70 |
| 2005/0261573 | A1 * | 11/2005 | Satoh | G06K 9/3208 600/415 |
| 2006/0031014 | A1 * | 2/2006 | Sato | G01C 17/38 701/530 |
| 2007/0297695 | A1 * | 12/2007 | Aratani | G06K 9/3216 382/284 |
| 2010/0017128 | A1 * | 1/2010 | Zeng | B60W 40/105 701/301 |
| 2010/0235129 | A1 * | 9/2010 | Sharma | G01S 7/4972 702/97 |
| 2010/0324862 | A1 * | 12/2010 | Sato | G01C 17/38 702/150 |
| 2011/0007157 | A1 * | 1/2011 | Sekelsky | G01C 15/00 348/143 |
| 2012/0134457 | A1 * | 5/2012 | Suina | H04L 12/417 375/356 |
| 2012/0312960 | A1 * | 12/2012 | Mine | H04N 5/347 250/206 |
| 2013/0124142 | A1 * | 5/2013 | Zeck | G01G 19/387 702/173 |
| 2013/0218398 | A1 * | 8/2013 | Gandhi | B60R 16/02 701/31.1 |
| 2014/0163888 | A1 * | 6/2014 | Bowler | G01V 11/00 702/9 |
| 2015/0276923 | A1 * | 10/2015 | Song | G01S 7/4004 702/97 |
| 2015/0323651 | A1 * | 11/2015 | Poiger | G01S 7/4026 342/113 |
| 2016/0161597 | A1 * | 6/2016 | Treptow | G01S 7/4026 342/174 |
| 2016/0209211 | A1 * | 7/2016 | Song | G01B 21/24 |
| 2016/0223657 | A1 * | 8/2016 | Huntzicker | G01S 7/40 |

FOREIGN PATENT DOCUMENTS

| | | |
|---|---|---|
| CN | 103287358 A | 9/2013 |
| EP | 0557945 A2 | 9/1993 |

OTHER PUBLICATIONS

Song, Xiaofeng F., U.S. Appl. No. 14/598,894 entitled "Method for Determining Misalignment of an Object Sensor," filed Jan. 16, 2015.

STMicroelectronics, "Tilt measurement using a low-g 3-axis accelerometer," Apr. 2010.

USPTO, Office Action in U.S. Appl. No. 14/229,178 dated Sep. 8, 2016.

USPTO, Final Office Action in U.S. Appl. No. 14/229,178 dated Mar. 9, 2017.

State Intellectual Property Office of the People's Republic of China, Office Action in Chinese Patent Application No. 201510138567.X dated Dec. 7, 2016.

USPTO, Office Action in U.S. Appl. No. 14/229,178 dated Sep. 12, 2017.

State Intellectual Property Office of the People's Republic of China, Office Action in Chinese Patent Application No. 201610078716.2 dated Aug. 25, 2017.

* cited by examiner

VEHICLE SENSOR COMPENSATION

TECHNICAL FIELD

The present disclosure generally relates to vehicles, and more particularly relates to methods and systems pertaining to vehicle sensors.

BACKGROUND

Many vehicles today have sensors that obtain data pertaining to objects that may be in proximity to vehicles. For example, many vehicles today use radar sensors, cameras, and/or light detection and ranging (LIDAR) devices for obtaining data pertaining to such objects, which may include, for example, other vehicles, other moving objects, and/or fixed objects in proximity to the vehicle. However, in certain cases there can be a misalignment of such sensors, which could affect the data pertaining to the objects.

Accordingly, it is desirable to provide techniques for using data from vehicle sensors, such as radar, camera, and LIDAR sensors of vehicles, for example in the event of misalignment of such sensors. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining, via a sensor, sensor data pertaining to an object in proximity to a vehicle; estimating, using a processor, a misalignment angle for the sensor using the sensor data; and generating, using the processor, a correction factor for the measured azimuth angle value using the misalignment angle. The sensor data includes a measured azimuth angle value for the object.

In accordance with an exemplary embodiment, a system is provided. The system comprises a sensor and a processor. The sensor is configured to at least facilitating obtaining sensor data pertaining to an object in proximity to a vehicle. The sensor data includes a measured azimuth angle value for the object. The processor is coupled to the sensor, and is configured to at least facilitate estimating a misalignment angle for the sensor using the sensor data and generating a correction factor for the measured azimuth angle value using the misalignment angle.

In accordance with a further exemplary embodiment, a vehicle is provided. The vehicle comprises a body, a sensor, and a processor. The sensor is configured to at least facilitating obtaining sensor data pertaining to an object in proximity to the vehicle. The sensor data includes a measured azimuth angle value for the object. The processor is disposed within the body and coupled to the sensor. The processor is configured to at least facilitate estimating a misalignment angle for the sensor using the sensor data and generating a correction factor for the measured azimuth angle value using the misalignment angle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
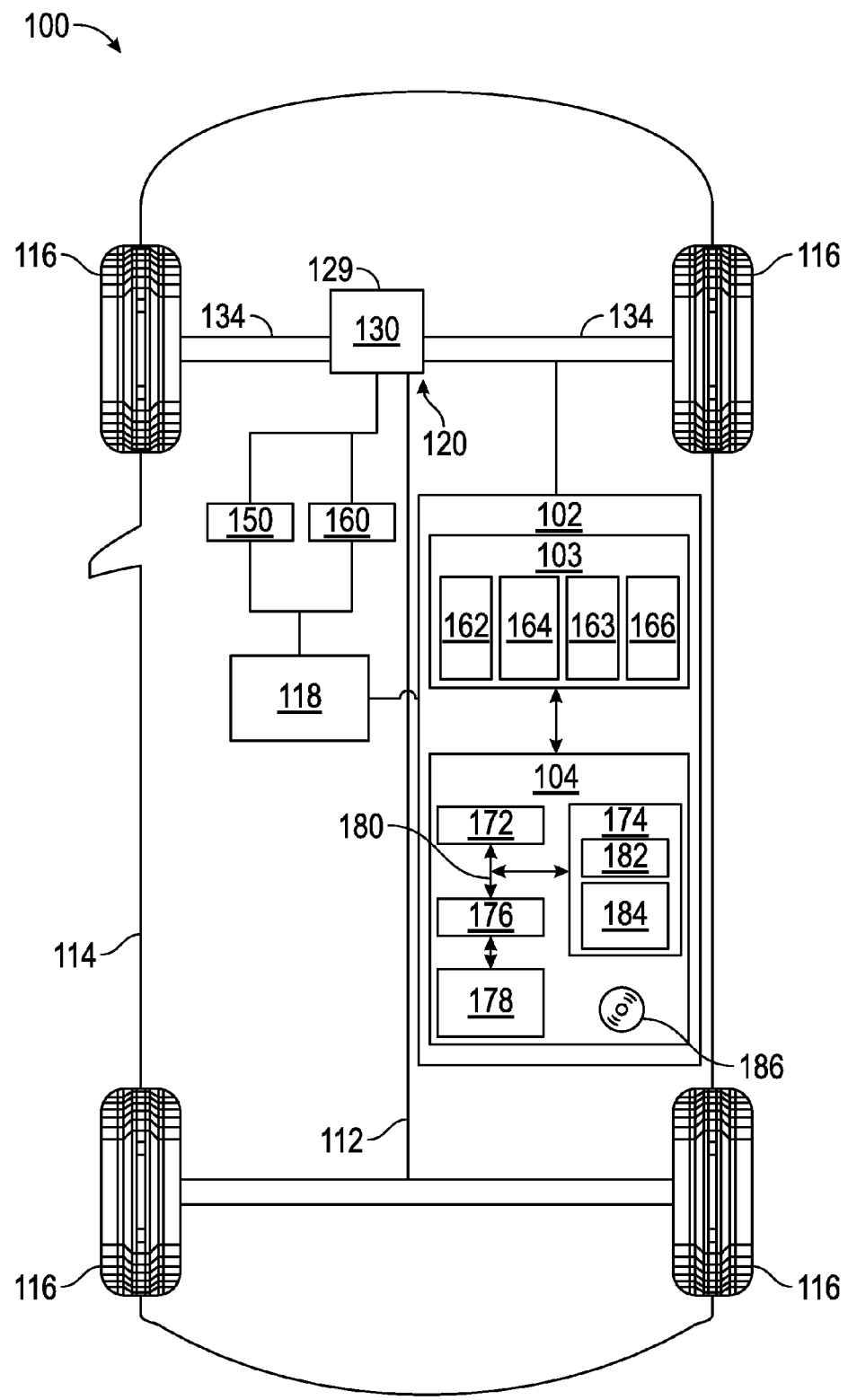
FIG. 1 is a functional block diagram of a vehicle that includes a control system that includes one or more sensors for obtaining sensor data pertaining to an object in proximity to the vehicle and a controller for the one or more sensors, in accordance with an exemplary embodiment.

FIG. 1 illustrates a vehicle 100, or automobile, according to an exemplary embodiment. As described in greater detail further below, the vehicle 100 includes a control system 102 for use in obtaining and utilizing data pertaining to object that may be in proximity to the vehicle 100. In certain embodiments, the control system 102 is part of and/or is coupled to one or more active safety systems for the vehicle 100, such as for automatic braking, braking assist, steering assist, traction control, electronic stability control, lane departure warning, lane change awareness, and/or for one or more other active safety features. As discussed further below, the control system 102 includes a sensor array 103 of one or more sensors 103 that obtain sensor data pertaining to objects in proximity to the vehicle 100, and a controller 104 that is used for controlling the sensor array 103.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 100, in certain embodiments the vehicle 100 may not include a steering wheel and/or steering. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver.

The control system 102 is mounted on the chassis 112. As discussed above, the control system 102 includes a sensor array 103 and a controller 104.

The sensor array 103 includes one or more sensors that obtain sensor data pertaining to one or more objects in proximity to the vehicle 100. In the depicted embodiment, the sensor array 103 includes one or more radar sensors 162, one or more cameras (also referred to herein as camera sensors) sensors 164, and/or one or more light detection and ranging (LIDAR) units (also referred to herein as LIDAR sensors) 166 that obtain sensor data pertaining to objects in proximity to the vehicle 100. Such objects, may include, by way of example, road edges, road signs, guard rails, medians, signs, buildings, trees, other vehicles, pedestrians, and/or various other moving and/or non-moving objects. In various embodiments the sensor array 102 may include a single radar sensor 162, a single camera 164, and/or a single LIDAR unit 166, and/or any combination of any number of radar sensors 162, cameras 164, and/or LIDAR units 166. In addition, in certain embodiments, the sensor array 103 may also include one or more other sensors 168, for example one or more wheel speed sensors and/or inertial measurement sensors for estimating a velocity of the vehicle 100. The measurements and information from the various sensors of the sensor array 103 are provided to the controller 104 for processing.

The controller 104 is coupled to the sensor array 103. The controller 104 utilizes the various measurements and information from the sensors array 103 for use in controlling, and compensating for, the sensors of the sensor array 103 (e.g., the radar sensors 162, the cameras 164, and/or the LIDAR units 166). In certain embodiments, the controller 104 utilizes dynamic monitoring of the sensors using the sensor data in order to estimate a misalignment angle of the sensors for use in compensating for measured values from the sensors. In certain embodiments, the controller 104, along with the sensor array 103, provide these and other functions also provide additional functions in accordance with the process 200 discussed further below in connection with FIGS. 2 and 3.

As depicted in FIG. 1, the controller 104 comprises a computer system. In certain embodiments, the controller 104 may also include one or more of the sensors of the sensor array 103, one or more other devices and/or systems, and/or components thereof. In addition, it will be appreciated that the controller 104 may otherwise differ from the embodiment depicted in FIG. 1. For example, the controller 104 may be coupled to or may otherwise utilize one or more remote computer systems and/or other control systems, such as the electronic control system 118 of FIG. 1.

In the depicted embodiment, the computer system of the controller 104 includes a processor 172, a memory 174, an interface 176, a storage device 178, and a bus 180. The processor 172 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 172 is connected to the sensor array 103 through serial communication; however, this may vary in other embodiments. During operation, the processor 172 executes one or more programs 182 contained within the memory 174 and, as such, controls the general operation of the controller 104 and the computer system of the controller 104, generally in executing the processes described herein, such as the process 200 described further below in connection with FIGS. 2 and 3. Also in one embodiment, the processor 172 is coupled to the sensor array 103, and utilizes values from the various sensors of the sensor array 103 for performing the functions of the controller 104.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g., any stored threshold values) for use in making the determinations.

The bus 180 serves to transmit programs, data, status and other information or signals between the various components of the computer system of the controller 104. The interface 176 allows communication to the computer system of the controller 104, for example from a system driver and/or another computer system, and can be implemented using any suitable method and apparatus. In one embodiment, the interface 176 obtains the various data from the sensors of the sensor array 103. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIGS. 2 and 3. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 104 may also otherwise differ from the embodiment depicted in FIG. 1, for example in that the computer system of the controller 104 may be coupled to or may otherwise utilize one or more remote computer systems and/or other control systems.

While the control system 102, the sensory array 103, and the controller 104 are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, and/or the electronic control system 118.

Figure 2:
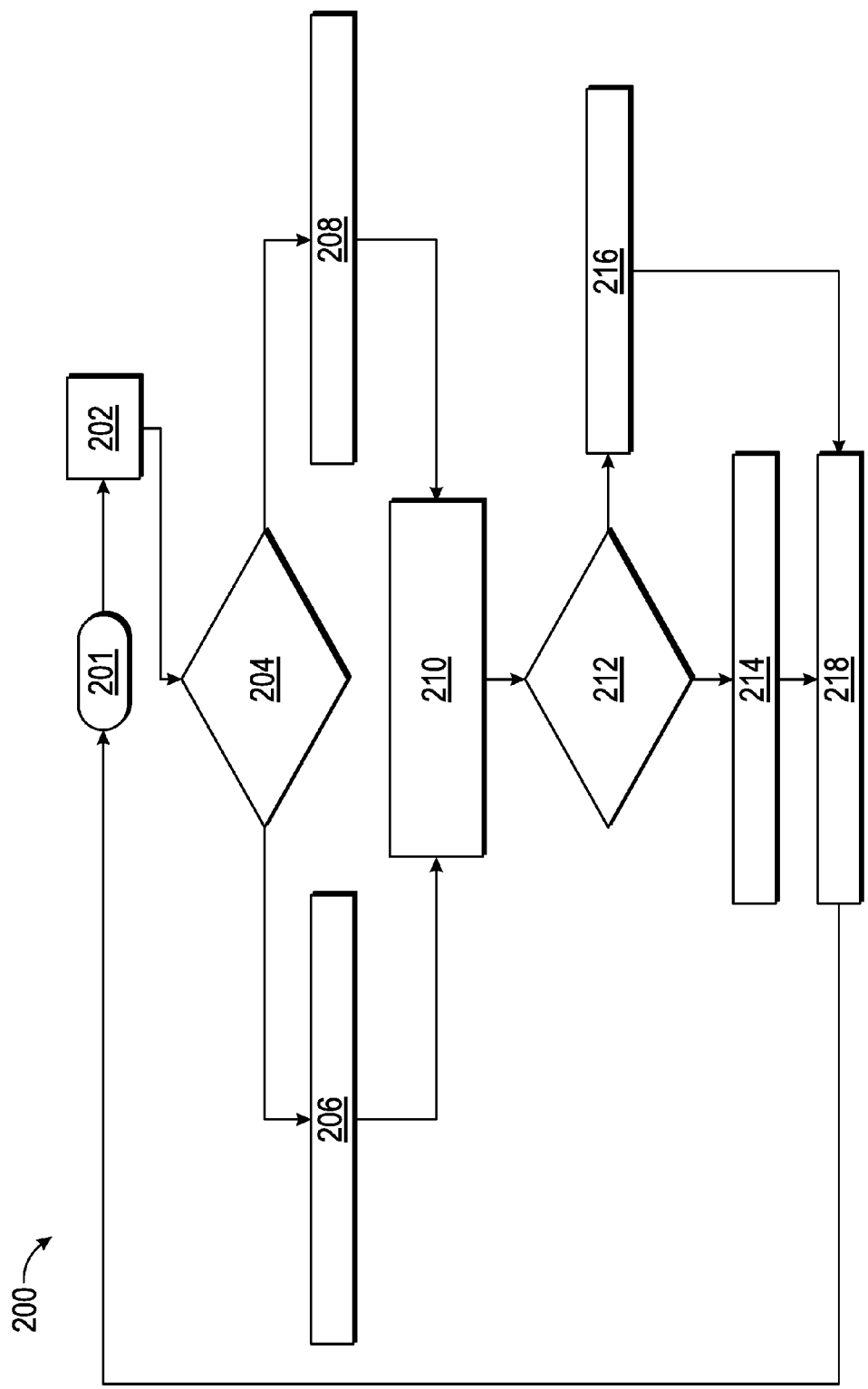
FIG. 2 is a flowchart of a process for controlling a sensor of a vehicle, and that can be used in connection with the vehicle and the control system of FIG. 1, in accordance with an exemplary embodiment.

FIG. 2 is a flowchart of a process 200 for controlling a sensor of a vehicle, in accordance with an exemplary embodiment. The processor 200 can be used in connection with the vehicle 100 and the control system 102 of FIG. 1, in accordance with an exemplary embodiment. In one embodiment, the various steps of the process 200, is performed repeatedly, and preferably continuously, in various loops or iterations throughout the current vehicle drive or vehicle ignition cycle.

As depicted in FIG. 2, the process 200 is initiated at step 201. Once the process is initiated, sensor data is obtained (step 202). The sensor data pertains to objects that are in proximity to the vehicle 100 of FIG. 1. In various embodiments, the objects may comprise one or more road edges, road signs, guard rails, medians, signs, buildings, trees, other vehicles, pedestrians, and/or various other moving and/or non-moving objects that are in proximity to the vehicle and/or the roadway on which the vehicle is travelling. Also in one embodiment, the sensor data includes a position of the sensor, a range between the object and the vehicle, a rate of change of the range, an azimuth angle between the object and the vehicle, a rate of change of the azimuth angle, and a velocity of the vehicle with respect to the object, as determined by the sensor (e.g., the radar, camera, or LIDAR sensor).

In various embodiments, the sensor data is obtained via the transmission and receipt of signals using the radar sensors 162, camera sensors 164, and/or LIDAR sensors 166 of FIG. 1. In one embodiment, the respective sensors transmit signals using a transmitter. The transmitting signals subsequently contact the objects on or alongside the road on which the vehicle 100 is travelling. After contacting the objects, the signals are reflected, and travel from the other vehicles and/or other objects in various directions, including some signals returning toward the vehicle 100. The signals returning to the vehicle 100 received signals) are received by one or more receivers, and are then provided to the processor 172 of FIG. 1 (for example, via the interface 176 of the controller 104) for processing. In certain embodiments, in addition to the received signals, the processor 172 also obtains additional data from one or more additional sensors 168 of the sensor array 103 of FIG. 1 via the interface 176 (e.g. vehicle velocity values via one or more wheel speed sensor and/or inertial measurement sensors). In one embodiment, the processor 172 calculates the host vehicle's velocity based on wheel speed values, inertial measurement values, and steering angle values provided by one or more wheel speed sensors, inertial measurement units, and steering wheel sensors of the vehicle.

A determination is made, based on the sensor data, as to whether conditions are conducive for estimating one or more sensor misalignment angle(s) based on one or both a first technique and a second technique (step 204). In one embodiment, the misalignment angle pertains to a difference between an actual mounting angle and an expected mounting angle for the same sensor(s) (e.g., radar system, camera, or LIDAR unit) that is collecting data regarding the objects in proximity to the vehicle. Also in one embodiment, the first technique comprises a parallel motion based approach that assumes that the object in question is travelling in parallel to the vehicle 100, for example as set forth in greater detail in U.S. patent application Ser. No. 14/598,894 entitled Method for Determining Misalignment of an Object Sensor, filed on Jan. 16, 2015, the entirety of which is incorporated herein by reference. Also in one embodiment, the second technique comprises a stationary object based approach that assumes that the object in question is stationary, for example as set forth in greater detail in U.S. patent application Ser. No. 14/229,178 entitled System and Method for Determining of and Compensating for Misalignment of a Sensor, filed on Mar. 28, 2014, the entirety of which is incorporated herein by reference. In one embodiment, the determination of step 204 is made by the processor 172 of FIG. 1.

In one embodiment, the first approach (e.g., the parallel motion approach) and the second approach (e.g., the stationary object approach) are both utilized regardless of the conditions as reflected in the sensor data. In one such embodiment, the conditions of step 204 can be always deemed to be satisfied for both the first and the second techniques. In other embodiments, the conditions for the first and second techniques may be satisfied based on various conditions such as those set forth below. For example, in one embodiment, if it is known from the sensor data that the object in question is moving substantially parallel to the vehicle 100, then the parallel motion approach alone may be used. Similarly, in one embodiment, if it is known from the sensor data that the object in question is stationary, then the stationary object approach alone may be used. Also in one embodiment, if neither of these conditions (i.e., parallel movement of the object or the object being stationary) are determined to have been met by a reasonable degree of certainty, then the corresponding objects are considered invalid objects and are not used for calculation (in such event, the method will continue look for other valid objects in current and future loops and process accordingly, in one embodiment).

If it is determined that conditions for the first technique have been met, then the misalignment angle of the sensor is estimated using the first technique (step 206). In one embodiment in which the first technique comprises the above-described parallel motion technique, a first misalignment angle value for the sensor is calculated as follows:

$$\alpha \cong -\frac{\dot{r}\sin\theta + r\cos\theta\dot{\theta}}{\dot{r}\cos\theta - r\sin\theta\dot{\theta}}, \qquad \text{(Equation 1)}$$

in which "$\alpha$" represents the misalignment angle, "r" represents the range (or distance) between the object and the vehicle, "$\dot{r}$" represents the rate of change (or rate) of the range, "$\theta$" represents the azimuth angle between the object and the vehicle, and "$\dot{\theta}_t$" represents the rate of change (or rate) of the azimuth angle. In one embodiment, these calculations are performed by the processor 172 of FIG. 1.

If it is determined that conditions for the second technique have been met, then the misalignment angle of the sensor is estimated using the second technique (step 208). In one embodiment in which the first technique comprises the above-described stationary object technique, a second misalignment angle value for the sensor is calculated as follows:

$$\alpha = \arccos\left(-\frac{\dot{r}}{v_H}\right) - \theta, \qquad \text{(Equation 2)}$$

in which $v_H$ represents a velocity of the vehicle with respect to the object. In one embodiment, these calculations are performed by the processor 172 of FIG. 1.

As discussed above, in certain embodiments the estimate of the motion of the vehicle is generated using both the first and second techniques in each iteration. Also as discussed above, in certain other embodiments, the first technique, the second technique, or both may be utilized in any particular iteration based on the conditions represented in that particular iteration by the sensor data. Furthermore, because the steps are repeated throughout the vehicle drive or ignition cycle, the selection of the first technique, the second technique, or both, may be determined separately for each iteration or loop. For example, if the conditions for only the first technique are reflected by the sensor data for the first loop or iteration, then only the first technique may be used for the first iteration in one embodiment. By way of further example, if the conditions for only the second technique are reflected by the sensor data for the second loop or iteration, then only the second technique may be used for the second iteration in one embodiment. Similarly, if the conditions for both the first technique and the second technique are reflected by the sensor data for the third loop or iteration, then the first technique and the second technique may be used for the third iteration in one embodiment, and so on.

An average value for the misalignment angle is determined (step 210). In one embodiment, the average value is calculated by the processor 172 of FIG. 1 using the first misalignment angle value of step 206 and the second misalignment value of step 208. In one such embodiment, a weighted average value is obtained in step 210 for the misalignment angle. In certain embodiment, the weighting factors may vary based on which technique is utilized (for example for stationary versus moving objects). In one embodiment, the weighting factors are based at least in part on which technique is used. In one embodiment, the a first technique is used for tracked objects that are currently stationary (for example, objects that have previously been tracked as not moving and that continue to not move, or objects that have been previously tracked as moving but are not currently moving), whereas the second technique is used for moving objects, for example if the object is new (or newly located) or has been continuously tracked for at least a predetermined number of loops or iterations. In one embodiment, stationary objects are given more weight than moving objects, and objects that have been tracked for at least a predetermined number of loops or iterations are given more weight than new objects.

A determination is made as to whether the process is in an initial stage (step 212). In one embodiment, this determination is made by the processor 172 of FIG. 1 based on an amount of time that has elapsed from the beginning of the current vehicle drive or ignition cycle. For example, in one embodiment, the process is deemed to be in the initial stage if the present loop or iteration is occurring less than a predetermined threshold amount of time after the beginning of the current vehicle drive or ignition cycle. Similarly, also in one embodiment, the process is deemed to n not be in the initial stage if the present loop or iteration is occurring after the predetermined threshold amount of time after the beginning of the current vehicle drive or ignition cycle. Also in one embodiment, the predetermined amount of time is stored in the memory 174 as a stored value 184 therein, and represents an amount of time after which sensor data (e.g., radar, camera, and/or LIDAR) with respect to the objects in proximity to the vehicle is expected to converge to reasonable stable values. In one embodiment, the predetermined threshold is equal to approximately 2600 seconds; however, this may vary in other embodiments. In one embodiment, the threshold is calibratable, and the value may change depending on the actual setups. In one example (consistent with the example provided above, in which the starting time stamp is equal to 2500 seconds), the threshold is equal to approximately 100 seconds in accordance with one embodiment. However, this may vary in other embodiments.

If it is determined that the process is in the initial stage, then a first filtering technique is applied (step 214). In one embodiment, the filtering is applied by the processor 172 of FIG. 1 to the sensor data of step 202 using the first filtering technique to generate filtered data. Also in one embodiment, the first filtering technique comprises a relatively light or less intensive filtering approach. In one example, the light filtering approach uses first order filtering in accordance with the following equation:

$$X_z = a^*c + X_{z-1}^*(1-c) \qquad \text{(Equation 3)},$$

wherein $X_{z-1}$ represents the previous loop's filtered value, "a" represents the current loop's instantaneous value, $X_z$ represents the current loop's filter value, and "c" is the filter coefficient. Also in one embodiment, in light filtering, "c" is set to a relatively large value, as compared with the "c" value that is used in heavier filtering. In one embodiment, in the example given, the "c" value is set to 0.003 for light filtering, and 0.001 for heavy filtering. However, this may vary in other embodiments.

Conversely, if it is determined that the process is not in the initial stage, then a second filtering technique is applied (step 216). In one embodiment, the filtering is applied by the processor 172 of FIG. 1 to the sensor data of step 202 using the second filtering technique to generate filtered data. Also in one embodiment, the second filtering technique comprises a relatively heavy or more intensive filtering approach, such as the exemplary heavy filtering embodiment discussed above.

Per the discussion above, the various steps of the process 200 are preferably performed repeatedly throughout the vehicle drive or ignition cycle. Accordingly, in one embodiment, the first filtering technique of step 214 will be used for a number of the initial iterations or loops at the beginning of the current vehicle drive or ignition cycle, and the second filtering technique of step 216 will be subsequently used for the remaining iterations or loops of the vehicle drive or ignition cycle. Accordingly, a dual-stage filter is applied to the sensor data over various iterations or loops.

Compensation is provided for the sensor (step 218). In one embodiment, the compensation is provided by the processor 172 for the various sensor(s) of the sensor array 103 (e.g., radar 162, camera 164, and/or LIDAR 166) that obtained the radar data in step 202 pertaining to the object in proximity to the vehicle 100. In certain embodiments, the weighted average of step 210 for the misalignment angle "α" is used to generate the compensation (also referred to herein as a correction factor) as follows:

$$\theta_{c,i} = \theta_i + \alpha_0 + \alpha \quad \text{(Equation 4)},$$

in which "$\theta_i$" is the measured value of the azimuth angle between the object and the vehicle (as measured by the sensor as part of the sensor data of step 204), "$\alpha_0$" represents the nominal (or expected) angle of mounting of the sensor with respect to the front of the vehicle (e.g., as noted in manufacturing specifications or the like), "α" is the misalignment angle of the sensor (for example, as determined using the weighted average of step 210), and $\theta_{c,i}$ is the revised (or compensate) azimuth angle between the object and the vehicle. It will be appreciated that in one embodiment X and Y components (for a vehicle X,Y coordinate system) may be used for the various parameters of Equation 4, including for the compensation for the sensor.

The revised azimuth angle can then be used by the control system 102 and/or by other vehicle systems in any number of vehicle functions, for example in connection with the steering system 150 of FIG. 1, the braking system 160 of FIG. 1, any number of active safety functions (such as automatic braking, braking assist, steering assist, traction control, electronic stability control, lane departure warning, and lane change awareness), and/or any number of other functions. In addition, in one embodiment, the process also returns to step 201 in a new iteration, as the steps of the process 200 repeat, preferably continuously, in new loops or iterations throughout the vehicle drive or ignition cycle.

Figure 3:
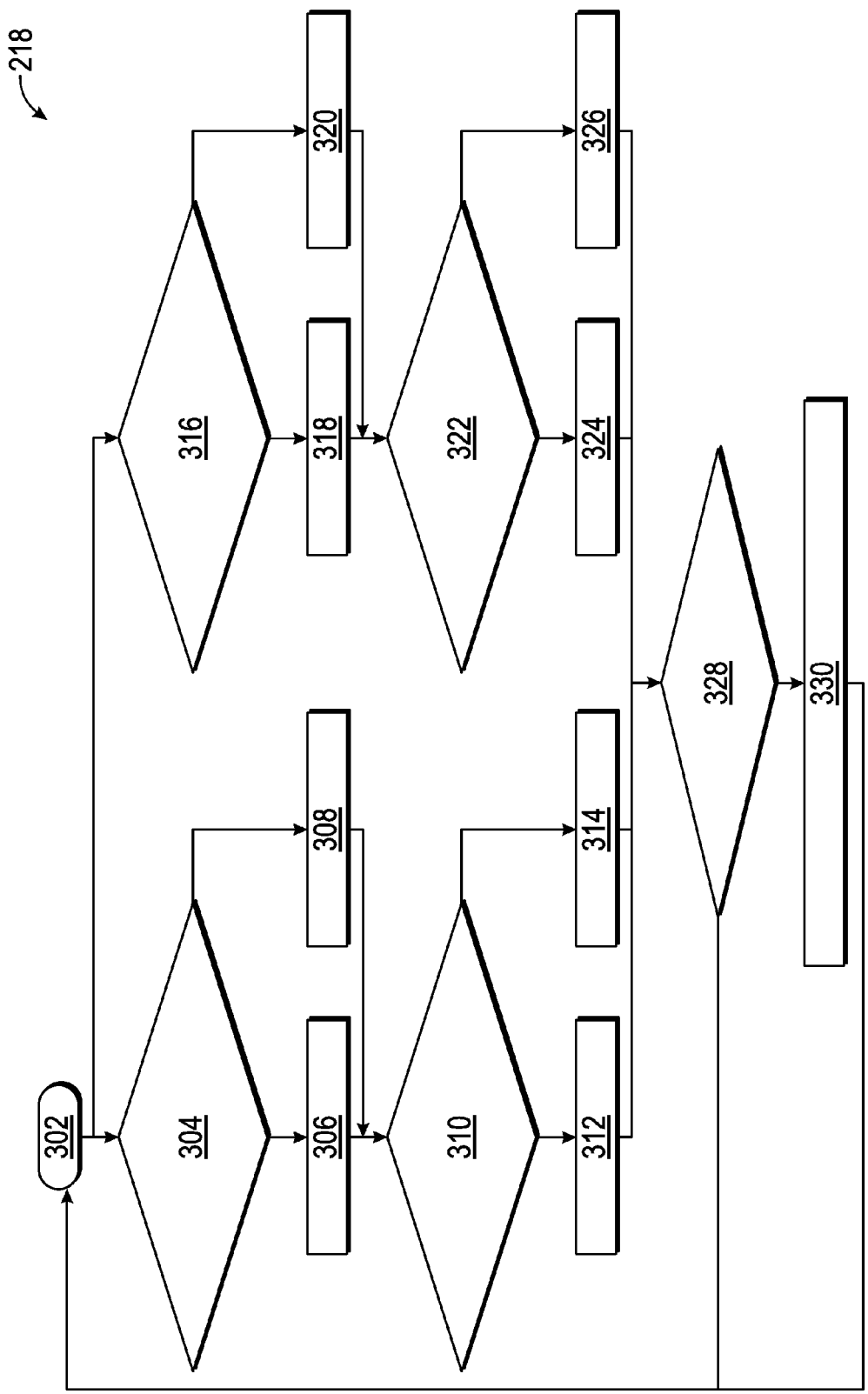
FIG. 3 is a flowchart for a sub-process of the process of FIG. 2, namely, a sub-process for compensating for a misalignment angle of a sensor of the control system, in accordance with an exemplary embodiment.

With reference to FIG. 3, in certain embodiments the compensation of step 218 may be provided only if certain additional conditions are also met. As depicted in FIG. 3, in one embodiment, step (or sub-process) 218 is initiated (step 302). Similar to the discussion above with respect to FIG. 2, the steps of FIG. 3 are also repeated, preferably continuously, throughout the vehicle drive or ignition cycle.

A determination is made as to whether the first misalignment angle of step 206 of FIG. 2 (e.g., using the parallel motion approach) exceeds a first fault threshold (step 304). In one embodiment, the first fault threshold is stored in the memory 174 of FIG. 1 as one of the stored values 184 thereof. In one embodiment, the threshold value represents a fault flag that is set to plus or minus three degrees of misalignment. However, this may vary in other embodiments. If the first misalignment angle is greater than the first fault threshold, then a first fault counter (for the first misalignment estimation technique) is incremented (step 306). Conversely, if the first misalignment angle is less than or equal to the first fault threshold, then a first fault counter (for the first misalignment estimation technique) is decremented (step 308). In one embodiment, steps 304-308 are performed by the processor 172 of FIG. 1.

A determination is made as to whether the first fault counter has exceeded a first counter threshold (step 310). In one embodiment, the first counter threshold is equal to the calibrated fault mature time plus a hysteresis value. If the first fault counter is greater than the first counter threshold, then a flag for the first counter is set to true (step 312). Conversely, if the first counter is less than or equal to the first counter threshold, then the flag for the first counter is set to false (step 314). In one embodiment, steps 310-314 are performed by the processor 172 of FIG. 1.

In addition, a determination is made as to whether the second misalignment angle of step 208 of FIG. 2 (e.g., using the stationary object approach) exceeds a second fault threshold (step 316). In one embodiment, the second fault threshold is stored in the memory 174 of FIG. 1 as one of the stored values 184 thereof. In one embodiment, this threshold is equal to approximately plus or minus three degrees. However, this may vary in other embodiments. If the second misalignment angle is greater than the second fault threshold, then a second fault counter (for the second misalignment estimation technique) is incremented (step 318). Conversely, if the second misalignment angle is less than or equal to the second fault threshold, then a second fault counter (for the second misalignment estimation technique) is decremented (step 320). In one embodiment, steps 316-320 are performed by the processor 172 of FIG. 1.

A determination is made as to whether the second fault counter has exceeded a second counter threshold (step 322). In one embodiment, the second counter threshold is equal to the calibrated fault mature time plus a hysteresis value. If the second fault counter is greater than the second counter threshold, then a flag for the second counter is set to true (step 324). Conversely, if the second counter is less than or equal to the second counter threshold, then the flag for the second counter is set to false (step 326). In one embodiment, steps 322-326 are performed by the processor 172 of FIG. 1.

A determination is made as to whether the first fault flag and the second fault flag are both set to true (step 328). In one embodiment, this determination is made by the processor 172 of FIG. 1 based on the most recent iterations of steps 312, 314, 324, and 326. In one embodiment, if it is determined that the first fault flag and the second fault flag are both set to true, then the compensation is provided for the sensor (step 330), preferably in the manner set forth above in connection with the discussion of step 218 of FIG. 2. Conversely, in one embodiment, if it is determined that one or both of the first fault flag and/or the second fault flag are set to false, then the process returns instead to step 302, as steps 302-328 repeat until a determination is made that the first and second fault flags are both set to true. In addition, in one embodiment, the process also returns to step 302 for a new iteration following step 330, as depicted in FIG. 3.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. In addition, it will be appreciated that certain steps of the process 200 may vary from those depicted in FIGS. 2 and 3 and/or described above in connection therewith. It will similarly be appreciated that certain steps of the method described above may occur simultaneously or in a different order than that depicted in FIGS. 2 and 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   obtaining, via a sensor, sensor data pertaining to an object in proximity to a vehicle, the sensor data including a measured azimuth angle value for the object;
   applying a dual-stage filter to the sensor data, generating filtered sensor data;
   estimating, using a processor, a first misalignment angle value for the sensor, using the filtered sensor data, via a first technique, including comparing the measured azimuth angle value to a first known value;
   estimating, using the processor, a second misalignment angle value for the sensor, using the filtered sensor data, via a second technique that is different from the first technique, including comparing the measured azimuth angle value to a second known value; and
   generating, using an algorithm within the processor, a correction factor for the measured azimuth angle value using the first technique and the second technique together, based on the first misalignment angle value and the second misalignment angle value, based on a weighted average of the first misalignment angle value and the second misalignment angle value, wherein the first misalignment angle value is given a first non-zero weight based on the first technique, and the second misalignment angle value is given a second non-zero weight, different from the first non-zero weight, based on the second technique;
   wherein:
   the step of estimating the first misalignment angle value comprises estimating the first misalignment angle value via a first equation, namely:

$$\alpha \cong -\frac{\dot{r}\sin\theta + r\cos\theta\dot{\theta}}{\dot{r}\cos\theta - r\sin\theta\dot{\theta}},$$

the step of estimating the second misalignment angle value comprises estimating the second misalignment angle value via a second equation, namely:

$$\alpha = \arccos\left(-\frac{\dot{r}}{v_H}\right) - \theta;$$

and
   wherein "α" represents a misalignment angle, "r" represents a range between the object and the vehicle, "$\dot{r}$" represents the rate of change of the range, "θ" represents an azimuth angle between the object and the vehicle, and "$\dot{\theta}_i$" represents a rate of change of the azimuth angle, and wherein vH represents a velocity of the vehicle with respect to the object and $\dot{r}$ comprises a relative velocity in the radial direction from the object to the vehicle, such that $\dot{r}$ is the vector projection of $v_H$ on a line between the vehicle and the object at a particular moment.

2. The method of claim 1, further comprising:
   estimating a rate of change of a range between the object and the vehicle using the sensor data; and
   wherein the step of estimating the first misalignment angle value comprises estimating the first misalignment angle value using the measured azimuth angle value and the rate of change of the range.

3. The method of claim 1, wherein:
   the step of estimating the first misalignment angle value comprises estimating the first misalignment angle value using a parallel motion approach; and
   the step of estimating the second misalignment angle value comprises estimating the second misalignment angle value using a stationary object approach.

4. The method of claim 1, wherein:
   the step of estimating the first misalignment angle value comprises estimating the first misalignment angle value using the measured azimuth angle value, a rate of change of the measured azimuth angle value, a range between the object and the vehicle, and a rate of change of the range; and
   the step of estimating the second misalignment angle value comprises estimating the second misalignment angle value using the measured azimuth angle value, and a velocity of the vehicle with respect to the object $\dot{r}$ $\dot{r}$ $v_H$.

5. The method of claim 1, further comprising:
   incrementing a first counter when the first misalignment angle value exceeds a first threshold;
   incrementing a second counter when the second misalignment angle value exceeds a second threshold; and
   wherein the step of generating the correction factor comprises generating the correction factor using the first misalignment angle value and the second misalignment angle value when the first counter exceeds a third threshold and the second counter exceeds a fourth threshold.

6. The method of claim 1, wherein the step of applying the dual-stage filter to the sensor data comprises:
   determining an amount of time that has elapsed from a beginning of a current vehicle drive or ignition cycle;
   utilizing a first filtering technique, comprising a first filtering approach, if the amount of time is less than a predetermined time threshold; and
   utilizing a second filtering technique, comprising a second filtering approach that is relatively more intensive as compared with the first filtering approach, if the amount of time is greater than the predetermined time threshold.

7. The method of claim 3, wherein the weighted average utilizes a relatively larger weight for stationary objects than for moving objects.

8. A system comprising:
a sensor configured to at least facilitate obtaining sensor data pertaining to an object in proximity to a vehicle, the sensor data including a measured azimuth angle value for the object; and
a processor coupled to the sensor and configured to at least facilitate, using an algorithm:
applying a dual-stage filter to the sensor data, generating filtered sensor data;
estimating a first misalignment angle value for the sensor using the filtered sensor data, via a first technique, including comparing the measured azimuth angle value to a known value;
estimating a second misalignment angle value for the sensor, using the filtered sensor data, via a second technique that is different from the first technique, including comparing the measured azimuth angle value to a second known value; and
generating a correction factor for the measured azimuth angle value using the first technique and the second technique together, based on the first misalignment angle value and the second misalignment angle value, based on a weighted average of the first misalignment angle value and the second misalignment angle value, wherein the first misalignment angle value is given a first non-zero weight based on the first technique, and the second misalignment angle value is given a second non-zero weight, different from the first non-zero weight, based on the second technique;
wherein the processor is configured to at least facilitate, using the algorithm:
estimating the first misalignment angle value via a first equation, namely:

$$\alpha \cong -\frac{\dot{r}\sin\theta + r\cos\theta\dot{\theta}}{\dot{r}\cos\theta - r\sin\theta\dot{\theta}},$$

estimating the second misalignment angle value via a second equation, namely:

$$\alpha = \arccos\left(-\frac{\dot{r}}{v_H}\right) - \theta;$$

and
wherein "α" represents a misalignment angle, "r" represents a range between the object and the vehicle, "$\dot{r}$" represents the rate of change of the range, "θ" represents an azimuth angle between the object and the vehicle, and "$\dot{\theta}_i$" represents a rate of change of the azimuth angle, and wherein vH represents a velocity of the vehicle with respect to the object and $\dot{r}$ comprises a relative velocity in the radial direction from the object to the vehicle, such that $\dot{r}$ is the vector projection of $v_H$ on a line between the vehicle and the object at a particular moment.

9. The system of claim 8, wherein the processor is configured to at least facilitate:
estimating a rate of change of a range between the object and the vehicle using the sensor data; and
estimating the first misalignment angle value using the measured azimuth angle value and the rate of change of the range.

10. The system of claim 8, wherein the processor is configured to at least facilitate:
estimating the first misalignment angle value using a parallel motion approach; and
estimating the second misalignment angle value using a stationary object approach.

11. The system of claim 8, wherein the processor is configured to at least facilitate:
estimating the first misalignment angle value using the measured azimuth angle value, a rate of change of the measured azimuth angle value, a range between the object and the vehicle, and a rate of change of the range; and
estimating the second misalignment angle value using the measured azimuth angle value and a velocity of the vehicle with respect to the object $\dot{r}$ $v_H$.

12. The system of claim 8, wherein the processor is configured to at least facilitate:
incrementing a first counter when the first misalignment angle value exceeds a first threshold;
incrementing a second counter when the second misalignment angle value exceeds a second threshold; and
generating the correction factor using the first misalignment angle value and the second misalignment angle value when the first counter exceeds a third threshold and the second counter exceeds a fourth threshold.

13. The system of claim 8, wherein the sensor comprises a radar sensor.

14. The system of claim 8, wherein the sensor comprises a camera sensor.

15. The system of claim 8, wherein the sensor comprises a light detection and ranging (LIDAR) sensor.

16. A vehicle comprising:
a body;
a sensor configured to at least facilitate obtaining sensor data pertaining to an object in proximity to the vehicle, the sensor data including a measured azimuth angle value for the object; and
a processor disposed within the body and coupled to the sensor, the processor configured to at least facilitate, using an algorithm:
applying a dual-stage filter to the sensor data, generating filtered sensor data;
estimating a first misalignment angle value for the sensor using the filtered sensor data, via a first technique, including comparing the measured azimuth angle value to a known value;
estimating, using the processor, a second misalignment angle value for the sensor, using the filtered sensor data, via a second technique that is different from the first technique, including comparing the measured azimuth angle value to a second known value; and
generating a correction factor for the measured azimuth angle value using the first technique and the second technique together, based on the first misalignment angle value and the second misalignment angle value;
wherein the processor is configured to at least facilitate, using the algorithm:
estimating the first misalignment angle value via a first equation, namely:

$$\alpha \cong -\frac{\dot{r}\sin\theta + r\cos\theta\dot{\theta}}{\dot{r}\cos\theta - r\sin\theta\dot{\theta}},$$

estimating the second misalignment angle value via a second equation, namely:

$$\alpha = \arccos\left(-\frac{\dot{r}}{v_H}\right) - \theta;$$

and
wherein "α" represents a misalignment angle, "r" represents a range between the object and the vehicle, "$\dot{r}$" represents the rate of change of the range, "θ" represents an azimuth angle between the object and the vehicle, and "$\dot{\theta}_i$" represents a rate of change of the azimuth angle, and wherein vH represents a velocity of the vehicle with respect to the object and $\dot{r}$ comprises a relative velocity in the radial direction from the object to the vehicle, such that $\dot{r}$ is the vector projection of $v_H$ on a line between the vehicle and the object at a particular moment.

* * * * *